United States Patent
Heim et al.

(10) Patent No.: US 9,360,975 B2
(45) Date of Patent: Jun. 7, 2016

(54) CAPACITIVE SENSOR DEVICE WITH ADDITIONAL SENSOR ELECTRODE FOR DETERMINING MODE OF OPERATION

(75) Inventors: Axel Heim, Munich (DE); Artem Ivanov, Lundshut (DE); Roland Aubauer, Wessling (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 132 days.

(21) Appl. No.: 14/115,541

(22) PCT Filed: May 20, 2012

(86) PCT No.: PCT/EP2012/058056
§ 371 (c)(1),
(2), (4) Date: May 20, 2014

(87) PCT Pub. No.: WO2012/150274
PCT Pub. Date: Nov. 8, 2012

(65) Prior Publication Data
US 2014/0267153 A1    Sep. 18, 2014

(30) Foreign Application Priority Data
May 4, 2011 (DE) .......................... 10 2011 075 276

(51) Int. Cl.
*G06F 3/044* (2006.01)
*G06F 3/02* (2006.01)
(Continued)

(52) U.S. Cl.
CPC ................ *G06F 3/044* (2013.01); *G06F 3/023* (2013.01); *G06F 3/0213* (2013.01); *G06F 3/03543* (2013.01)

(58) Field of Classification Search
None
See application file for complete search history.

(56) References Cited

U.S. PATENT DOCUMENTS

| 6,204,839 B1 | 3/2001 | Mato, Jr. ....................... 345/168 |
| 2002/0030666 A1 | 3/2002 | Philipp .......................... 345/168 |

(Continued)

FOREIGN PATENT DOCUMENTS

| CN | 101650615 A | 2/2010 | .............. G06F 3/041 |
| CN | 201638157 U | 11/2010 | ................ G06F 3/02 |

(Continued)

OTHER PUBLICATIONS

International Search Report and Written Opinion, Application No. PCT/EP2012/058056, 7 pages, Oct. 5, 2012.

(Continued)

*Primary Examiner* — Ryan A Lubit
(74) *Attorney, Agent, or Firm* — Slayden Grubert Beard PLLC (57) ABSTRACT

A capacitive sensor device has at least one measuring electrode, at least one ground electrode, and an evaluation device being coupled with the at least one measuring electrode and being configured to detect a capacitive coupling between the at least one measuring electrode and a ground of the evaluation device.

At least one ground electrode can be galvanically coupled with the ground of the evaluation device via a switch. The switching status of the switch can be changed by the evaluation device. The evaluation device is further adapted to detect a common-mode change of the capacitive coupling between the at least one measuring electrode and the ground of the evaluation device when the switching status of the switch changes. An input device, particularly a keyboard with a capacitive sensor device, as well as a method for operating a capacitive sensor device may be designed accordingly.

19 Claims, 3 Drawing Sheets

(51) Int. Cl.
*G06F 3/0354* (2013.01)
*G06F 3/023* (2006.01)

(56) References Cited

U.S. PATENT DOCUMENTS

| | | | | |
|---|---|---|---|---|
| 2006/0232557 | A1* | 10/2006 | Fallot-Burghardt | G06F 3/011 345/168 |
| 2008/0266143 | A1 | 10/2008 | Ohshita et al. | 341/22 |
| 2008/0278178 | A1* | 11/2008 | Philipp | G06F 3/044 324/662 |
| 2010/0123676 | A1 | 5/2010 | Kirkup | 345/174 |
| 2011/0043227 | A1* | 2/2011 | Pance | G06F 1/1616 324/681 |
| 2011/0148790 | A1* | 6/2011 | Shih | G06F 3/0416 345/173 |
| 2011/0187637 | A1* | 8/2011 | Nichols | G06F 3/044 345/156 |
| 2011/0216035 | A1* | 9/2011 | Shih | G06F 3/045 345/174 |
| 2014/0232418 | A1 | 8/2014 | Heim et al. | 324/679 |

FOREIGN PATENT DOCUMENTS

| | | | | |
|---|---|---|---|---|
| CN | 103443731 A | 12/2013 | | G06F 1/16 |
| WO | 2012/150274 A1 | 11/2012 | | G06F 3/02 |

OTHER PUBLICATIONS

Chinese Office Action, Application No. 201280030197.2, 7 pages, Dec. 29, 2015.

* cited by examiner

CAPACITIVE SENSOR DEVICE WITH ADDITIONAL SENSOR ELECTRODE FOR DETERMINING MODE OF OPERATION

CROSS-REFERENCE TO RELATED APPLICATIONS

This application is a U.S. National Stage Application of International Application No. PCT/EP2012/058056 filed May 2, 2012, which designates the United States of America, and claims priority to DE Patent Application No. 10 2011 075 276.5 filed May 4, 2011. The contents of which are hereby incorporated by reference in their entirety.

TECHNICAL FIELD

The invention relates to a capacitive sensor device and an input device, particularly a keyboard, comprising a capacitive sensor device according to the present invention. The invention further relates to a method for operating an input device, particularly a keyboard, comprising a capacitive sensor device according to the present invention.

BACKGROUND

It is known to provide display devices, such as computer screens, with a touch-sensitive input area in order to move or control a cursor on the display area, for instance, by means of a finger by moving the finger. However, this concept of operation has the disadvantage that a user must take his hand off the keyboard in order to move the cursor on the display area of the screen. Thus, this concept of operation does not substantially differ from a corresponding input of the user via a separate computer mouse. It has been tried to overcome this disadvantage by providing respective input devices for controlling or moving a cursor already on the keyboard.

For example, keyboards are known, comprising a so-called track point in the area of the numeric pad or in the area of the alpha-numeric pad of the keyboard, which can be moved with a finger of a hand resting on the keyboard. However, moving such a trackpoint demands great skill and is furthermore hard to learn so that a user finally reverts to an external mouse despite an existing track point. Since a trackpoint is arranged between the keys of a keyboard, it can, on the one hand, interfere with the intended use of the keyboard, namely the input of text, and, on the other hand, an unintended moving of the track point cannot be avoided when entering text.

Another approach to solving the problem is to arrange a so-called trackball on or at the keyboard, which also enables the control of a computer mouse. Due to the size of the trackball said trackball is arranged outside the pad, which, however, has the disadvantage that a user has to take his hand off the pad and move it to the trackball for controlling the cursor. Another disadvantage is that a trackball requires additional space on the keyboard so that the entire keyboard tends to be larger in size.

Another known approach to solve the problem is to provide an additional entry field on the keyboard, for example next to the numeric pad, which is configured as touch-sensitive entry field. Moving a finger on the touch-sensitive entry field can cause a cursor to move on the screen. This concept also has the disadvantage that a user has to take his hand off the keypad in order to perform an input on the touch-sensitive area of the keyboard. Moreover, additional space is required for the touch-sensitive entry field, resulting in larger keyboards.

SUMMARY

The various embodiments are based on the problem to provide solutions in order to control a selection device, particularly a cursor of a graphical user interface with an input device, particularly a keyboard, without having to take the hand off the pad of the keyboard and simultaneously avoiding the disadvantages known from prior art. This and other objects can be achieved by the capacitive sensor device, input device and method as defined in the independent claims. Further enhancements are characterized in the dependent claims.

An embodiment provides a capacitive sensor device comprising
  at least one measuring electrode,
  at least one ground electrode, and
  an evaluation device being coupled with the at least one measuring electrode and being configured to detect a capacitive coupling between the at least one measuring electrode and a ground of the evaluation device,
wherein at least one ground electrode can be galvanically coupled with the ground of the evaluation device via a switch, wherein the switching status of the switch can be changed by means of the evaluation device, and wherein the evaluation device is further adapted to detect a common-mode change of the capacitive coupling between the at least one measuring electrode and the ground of the evaluation device when the switching status of the switch changes.

Each ground electrode of a number of ground electrodes can be galvanically coupled with the ground of the evaluation device via a switch, wherein the evaluation device can be further adapted to change the switching status of a switch in a predetermined order, respectively, and to detect a common-mode change of the capacitive coupling between at least one measuring electrode and the ground of the evaluation device.

The change of the switching status may comprise an opening of the switch.

Another embodiment furthermore provides an input device, particularly a keyboard, comprising a housing and a capacitive sensor device according to various embodiments, wherein the at least one measuring electrode and the at least one ground electrode are arranged at the housing relatively to one another in such a way that they can at least be partially covered and/or touched during operation of the input device with one hand.

The at least one measuring electrode may form a sensor area, which is configured for controlling a selection device, particularly a cursor of a graphical user interface, by moving at least one finger of the hand relatively to the sensor area, wherein the sensor area can be activated for detecting the movement of the at least one finger when the at least one ground electrode is covered by at least one more finger of the hand.

The ground electrode may be arranged at the housing in an isolated manner.

The at least one ground electrode may comprise metal.

The at least one ground electrode may be arranged in a cavity of the housing.

The at least one ground electrode may comprise a first ground electrode and a second ground electrode, which are arranged in the cavity of the housing and/or which are arranged on a mechanical key, respectively.

The at least one measuring electrode may be arranged in the area of the keys of a keyboard.

Another embodiment furthermore provides a method for the operation of an input device, particularly a keyboard, wherein an evaluation device taps a sensor signal at at least one measuring electrode in order to detect a capacitive coupling between the at least one measuring electrode and a ground of the evaluation device, and wherein for at least one ground electrode in a switching step, a switch via which the at least one ground electrode can be galvanically coupled with the ground of the evaluation device, is brought from a first switching status to a second switching status, in a testing step, the evaluation device checks whether the changing of the switching status of the switch has caused a common-mode change of the sensor signal, and wherein, in a changing step, the evaluation device changes the sensor device from a first operating mode to a second operating mode, in case the changing of the switching status of the switch has caused a common-mode change of the sensor signal.

The first operating mode may comprise a keyboard mode and the second operating mode may comprise a mouse mode.

The changing of the switching status of the switch may be performed at predetermined time intervals.

Preferably, a common-mode change of the sensor signal is detected once the sensor signal reaches a predetermined change of level when changing the switching status of the switch.

The switching step and the testing step can be performed for each of the at least one ground electrode.

BRIEF DESCRIPTION OF THE DRAWINGS

Further details and features of the invention as well as exemplary embodiments can be found in the following description in combination with the drawings. The drawings show.

DETAILED DESCRIPTION

Figure 1:
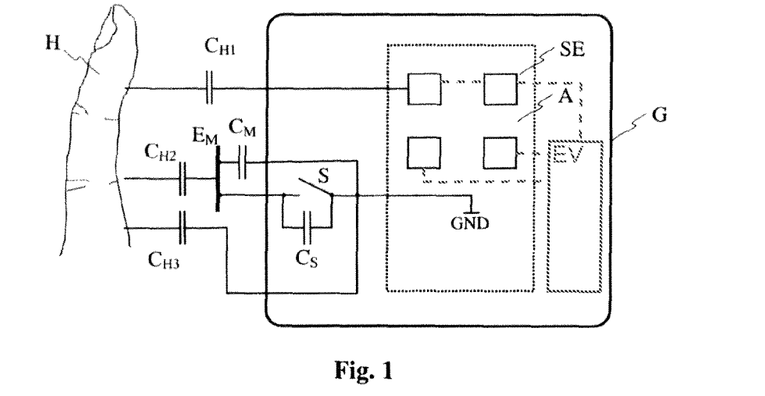
FIG. 1 an equivalent circuit diagram of a capacitive sensor device according to various embodiments for an input device, particularly a keyboard.

FIG. 1 shows an equivalent circuit diagram of a capacitive sensor device according to various embodiments for an electrical hand-held device, particularly for an input device for the detection of an approximation to the hand-held device or to the input device. The hand-held device comprises a sensor area A, which is formed by a number of sensor electrodes SE (also called measuring electrodes) coupled with an evaluation device EV. "Sensor electrodes" is used as synonym for "measuring electrodes" in the following. The position of a fingertip relative to the sensor area A can be determined, for instance, by means of the sensor electrodes SE without the finger touching or having to touch the sensor area A or the sensor electrodes SE. Furthermore, the approximation of a finger tip to the sensor area A or the touching of the sensor area by a finger tip can be detected.

The sensor electrodes of the sensor area as well as a transmitting electrode (transmitter electrode), which can be, for instance, configured as large-area electrode and can be arranged below the sensor electrodes, are coupled with an evaluation device of the capacitive sensor device. A housing G of the hand-held device or of the input device preferably comprises an electrically non-conducting material. The sensor electrodes and the transmitting electrode are arranged at the housing G. The housing G may also comprise an electrically conducting material, wherein the sensor electrodes and the transmitting electrode are arranged at the housing G in an isolated manner.

An additional ground electrode $E_M$ is arranged at the hand-held device, which can be coupled with the evaluation device of the capacitive sensor device. Preferably, the ground electrode $E_M$ is arranged at the hand-held device or at the input device in such a way that it can be at least partially covered or touched by the hand and/or by one or more finger(s). Preferably, the ground electrode $E_M$ is arranged at the hand-held device or at the input device in such a way that it can be touched by a thumb of a hand and that the other fingers or at least the index finger can run over or touch the sensor area A.

Sensor signals are detected at the sensor electrodes SE of the sensor area A, which correlate with the position of a finger tip relative to the sensor area A.

During normal operation of the electrical hand-held device or of the capacitive sensor device, the ground electrode $E_M$ is galvanically coupled with the ground GND of the capacitive sensor device. The coupling of the ground electrode $E_M$ of the ground GND of the capacitive sensor device can, for instance, be achieved via a switch S of a switch device.

By means of the ground electrode $E_M$ the signals tapped at the sensor electrodes SE can detect whether, for instance, there is a thumb of a hand operating the keyboard in a predetermined area of the keyboard, namely in that area where the ground electrode $E_M$ is arranged. When, for instance, a thumb is on the ground electrode $E_M$, the sensor area A can be switched from a keyboard mode to a mouse mode.

In the keyboard mode, the signals tapped at the sensor electrodes SE are only analyzed with regard to the fact whether or not a finger is placed on the ground electrode $E_M$ while a finger/a hand is simultaneously placed on the sensor area, as is described in detail in the following. When the analysis of the sensor signals during the keyboard mode shows that a finger, for example a thumb, is placed on the ground electrode $E_M$, the capacitive sensor device or the sensor area A can be switched from a keyboard mode to a mouse mode.

In the mouse mode, the capacitive sensor device or the evaluation device of the capacitive sensor device analyzes movements of one or more finger(s) relative to the sensor area A or the position of one or more finger(s) as long as one finger is placed on the ground electrode $E_M$. When the finger is taken off the ground electrode $E_M$, this is also detected by the evaluation device so that the capacitive sensor device or the sensor area A can be switched back to the keyboard mode.

The movement of one finger relative to the sensor area A detected in the mouse mode can be used in order to control or move a cursor of a graphical user interface. Thus, it is possible for the first time that a cursor can be controlled by a hand operating the keyboard without that the hand has to be taken off the pad of the keyboard since resting, for instance, a thumb of the operating hand on the ground electrode $E_M$ may cause a switching of the sensor area A from the keyboard mode to the mouse mode. Preferably, the ground electrode $E_M$ is arranged at the housing of the keyboard in such a way that it can be touched with the thumb of the hand laid on the keyboard without the hand having to be taken off the pad.

The sensor values detected at the measuring electrodes SE or measured in the sensor device are a measure of the capacities $C_{SE}$ between the measuring electrodes SE and the ground GND.

For an open switch (S=0), $C_{SE}$ is given by $$C_{SE}(S=0)=C_{H1}\oplus([C_{H2}\oplus(C_M\|C_S)]\|C_{H3}).$$

For a closed switch (S=1), $C_{SE}$ is given by $$C_{SE}(S=1)=C_{H1}\oplus(C_{H2}\|C_{H3}).$$

$C_{H1}$, $C_{H2}$ and $C_{H3}$ are the capacities between the hand and the measuring electrode SE, ground electrode $E_M$ or ground GND. $C_M$ and $C_S$ are the capacities between the ground electrode $E_M$ and the ground GND or the parasitic capacity of the switch S. The serial connection of capacities C1 and C2 is called C1∥C2 is called C1⊕C2 and the parallel connection is called C1∥C2.

The ground electrode $E_M$ can be galvanically coupled with the ground GND of the evaluation device of the capacitive sensor device via a switch S, i. e. that the ground electrode $E_M$ is coupled with the ground of the capacitive sensor device in case of closed switch S. The status of the switch S can, for instance, be controlled by a microcontroller of the capacitive sensor device. It is also possible that the switch S is controlled by a microcontroller of the input device, wherein only the status of the switch S has to be communicated to the evaluation device of the capacitive sensor device by the microcontroller of the input device.

In case of a switching (opening of the switch S or closing of the switch S), the common-mode of the sensor signals detected at the sensor electrodes SE of the sensor area A is changed. The extent of the common-mode change in case of a switching substantially depends on the capacity $C_{H2}$ between the ground electrode $E_M$ and the finger touching the ground electrode. The switching also causes a change of the sensor signals detected at the sensor electrodes of the sensor area A or the sensor data measured at the sensor electrodes of the sensor area A due to the modified capacitive ratio. In the keyboard mode, the corresponding capacity $C_{H2}$ is low due to the assumed distance between the finger and the ground electrode $E_M$ and that is why a changing of the switching status of the switch S only has a minor effect or no effect with regard to the detected sensor signals.

If there is no finger on the ground electrode $E_M$, the common-mode change only has a minor effect on the detected sensor signal or cannot be detected at all. In this case, it may be assumed after a switching that there is no finger on the ground electrode $E_M$. The sensor area A or the capacitive sensor device can then continue to be operated in the keyboard mode.

The hand H is coupled with at least one sensor electrode SE of the sensor area A or with the ground GND of the capacitive sensor device via the coupling capacities $C_{H1}$ and $C_{H3}$. The ground electrode $E_M$ is coupled with the ground of the capacitive sensor device via the coupling capacities $C_M$ and $C_S$. When the thumb in laid on, the coupling capacities $C_M$ and $C_S$ are assumed to be low with regard to the coupling capacity $C_{H2}$.

For example, resting the thumb of a hand operating the keyboard on the ground electrode $E_M$ results in an increase of the coupling capacity $C_{H2}$. The switching of the switch S results in a change of the capacitive coupling between the hand and the ground of the capacitive sensor device and thus also between the measuring electrodes SE and the ground of the sensor device, resulting in a common-mode change of the sensor signals tapped at the sensor electrodes SE.

The common-mode change has a considerably stronger effect on the sensor signals when a finger is laid on the ground electrode $E_M$ so that in case of a predetermined change of the level ΔP of the sensor signals when switching the switch S it can be assumed that the ground electrode $E_M$ is touched by a finger. For example, an opening of the switch results in a reduction of the capacitive coupling between the hand and the ground of the capacitive sensor device and thus also between the measuring electrodes SE and the ground of the sensor device, resulting in a common-mode change, i. e. in a level reduction of the sensor signals tapped at the sensor electrodes SE.

It is advantageous to arrange the ground electrode $E_M$ at the outside of the housing G in order to maximize the common-node change in case of a finger laid on the ground electrode $E_M$ during the switching of the switch S so that resting, for instance, a thumb on the ground electrode $E_M$ generates a galvanic coupling between the ground electrode $E_M$ and the thumb.

The capacitive sensor device according to various embodiments is particularly advantageous since no additional analogue front end has to be provided for the additional ground electrode $E_M$ because the ground electrode $E_M$ only has to be coupled with the evaluation device of the capacitive sensor device via a switch, i.e. it has to be galvanically coupled with the ground of the capacitive sensor device.

The test whether there is a finger on the ground electrode $E_M$ can be performed at regular intervals. For example, the test can be performed at intervals of approximately 200 ms. Of course, the existence of a finger on the ground electrode can also be tested at considerably shorter or longer intervals, which finally depends on the specific requirements with regard to the input device. When such a test detects a common-mode change of the sensor signals, it may be assumed that a finger is on the ground electrode $E_M$ so that the capacitive sensor device can be switched from the keyboard mode to the mouse mode.

Figure 2:
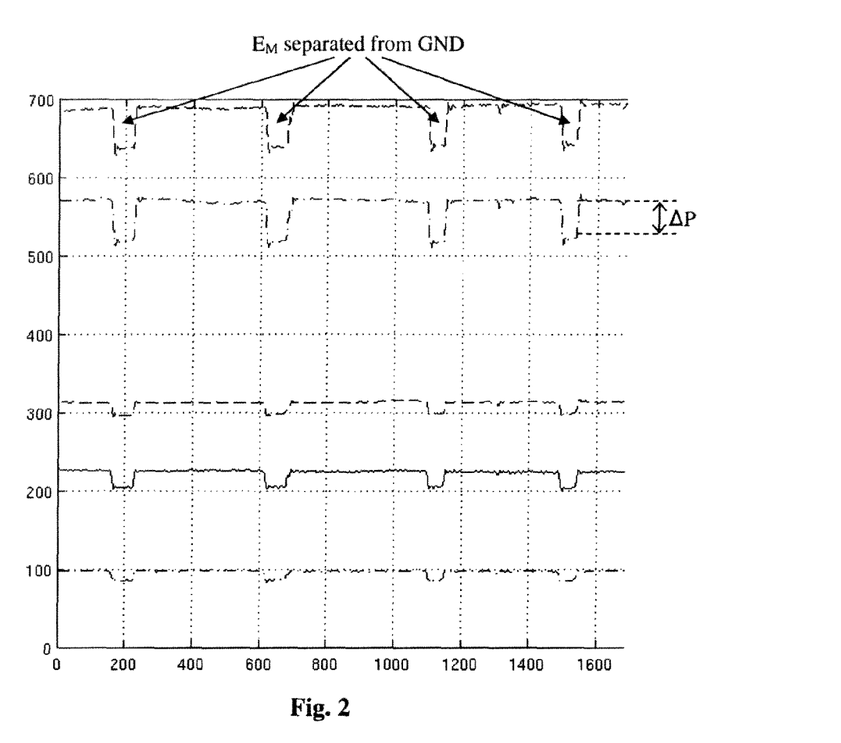
FIG. 2 the temporal progress of several sensor signals tapped at the measuring electrodes of a capacitive sensor device over time.

FIG. 2 provides an example of a course of five sensor signals over time, which are each tapped at a sensor electrode of the contact area A. The hand is in the area of the sensor electrodes SE, wherein the thumb lays on the ground electrode $E_M$ or touches the ground electrode $E_M$.

In case of the samples 180, 620, 1140 and 1520, an opening of the switch S results in a temporary separation of the capacitive sensor device ground electrode $E_M$ from the ground of the capacitive sensor device, leading to a common-mode change, i. e. to a level drop of the sensor signals. The detected common-mode change or the detected level drop of the sensor signals is used as event which activates a switching of the sensor device or of the sensor area from a keyboard mode to a mouse mode. As an alternative, the switch S can also be closed during normal operation and be opened at predetermined time intervals so that in case the hand rests on the sensor area and a finger touches the ground electrode $E_M$ at the same time there are substantially signal courses, which are inverse with regard to the signal courses shown in FIG. 2.

Furthermore, it may be provided that a switching from a keyboard mode to a mouse mode only takes place when the sensor signal reaches a predetermined change of level (ΔP)

when changing the switching status of the switch (S). This way it is ensured that an approximation to the ground electrode $E_M$ which is not sufficient for the switching of the operating mode but still leads to a change of the level does not cause a switching from the keyboard mode to the mouse mode. This way it is also ensured that the capacity is sufficient, that means that the hand/finger is close enough to the sensor area since otherwise the common-mode change would be small. This helps to efficiently avoid faulty activations.

Moreover, it may be provided that at least for a predetermined number of signal levels a predetermined change of level $\Delta P$ has to be detected in order to activate a switching from the keyboard mode to the mouse mode. For example, it may be provided that a corresponding change of level has to be detected with regard to at least two sensor signals. In another alternative it may be provided that at least an average change of level $\Delta P$ of all sensor signals has to be detected in order to cause a change of the operating mode.

It may be advantageous not to change the operating mode until at least a predetermined number of level changes are detected within a predetermined period in order to avoid faulty activations, for example in case of an unintended approximation of a finger to the ground electrode $E_M$, as far as possible. For example, it may be provided that within a predetermined period of for instance 200 ms at least three level changes in the order of $\Delta P$ have to be detected.

Figure 3:
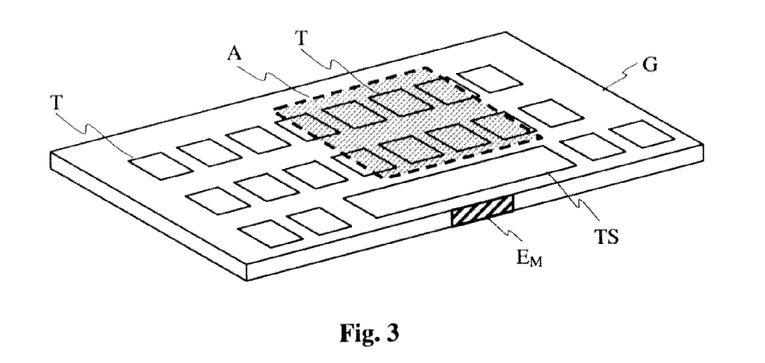
FIG. 3 an exemplary embodiment of an input device, particularly a keyboard.

FIG. 3 schematically shows a keyboard according to various embodiments. The keyboard comprises a housing G which preferably is made of electrically non-conducting material. There are a number of keys arranged at the upper side of the keyboard, which are provided for the intended use of the keyboard. Below the keys there is a sensor area A, which is formed by a number of sensor electrodes SE (not shown here). A ground electrode $E_M$ is arranged at the front side wall or in the front area, preferably in the area of the so-called "space bar" TS.

The sensor electrodes or the sensor area A and the ground electrode $E_M$ are arranged at the keyboard in such a way that in case of a hand resting on the keyboard the thumb can touch the ground electrode $E_M$ and at least one finger of the remaining fingers, such as the index finger, can perform movements in the area of the sensor area A relative to the surface of the keyboard at the same time. When the thumb rests on the ground electrode $E_M$, the capacitive sensor device or the sensor area A is in a mouse mode so that movements, such as of the index finger, relative to the surface of the keyboard are detected by the measuring electrodes or the sensor electrodes SE and can be converted into corresponding movements of the mouse of a graphical user interface. The movements of the finger relative to the keyboard surface are detected without contact. That means that the user, for instance, only has to run its index finger over the keys into the area of the sensor area A in order to cause a corresponding movement of the mouse. The keys of the keyboard do not have to be touched for this.

A particular advantage of the various embodiments is that only one finger, for example the thumb, has to be laid on the ground electrode $E_M$ for switching the keyboard from a keyboard mode to a mouse mode, wherein the hand does not have to be taken off the keyboard. Another advantage is that no predefined key has to be provided at the keyboard for the switching from a keyboard mode to a mouse mode. This way, the capacitive sensor device according to various embodiments can be integrated in already existing keyboards without having to change the layout of the keyboard. Another advantage is the intuitive operation of the keyboard in order to switch it from a keyboard mode to a mouse mode, on the one hand, and to control a cursor according to a movement of the finger in the mouse mode, on the other hand.

Figure 4:
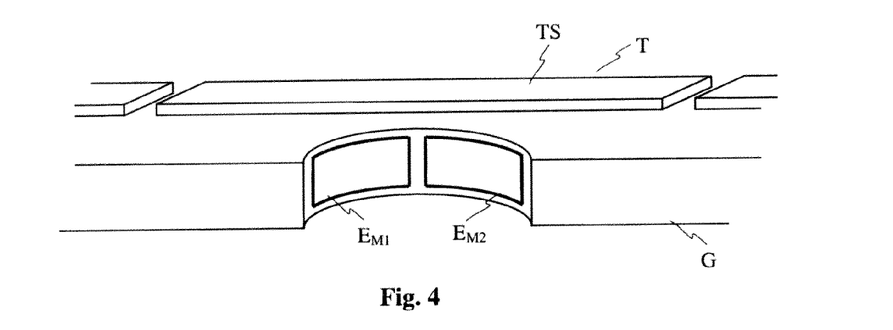
FIG. 4 a section of the front rim portion of a keyboard, wherein two ground electrodes of a capacitive sensor device according to various embodiments are arranged in a cavity of the keyboard housing.

FIG. 4 shows a section of a keyboard according to various embodiments in the area of the space bar TS, which is arranged in the lowermost row of keys T of the keyboard. In the area in front of the space bar TS, the housing G of the keyboard comprises a cavity at the rim portion, in which a first ground electrode $E_{M1}$ and a second ground electrode $E_{M2}$ are arranged adjacently to one another. The ground electrodes $E_{M1}$, $E_{M2}$ can be arranged at the surface of the housing G or at the inner face of the housing G. The ground electrodes $E_{M1}$, $E_{M2}$ can also be embedded in the housing.

The cavity is configured in such a way that a thumb of a hand resting on the keyboard finds space in a ergonomically advantageous way. Both ground electrodes $E_{M1}$, $E_{M2}$ can be coupled with the ground of the evaluation device of the capacitive sensor device via a switch, respectively.

By subsequently changing the switching status of the switch of the first ground electrode $E_{M1}$ and of the switch of the second ground electrode $E_{M2}$ and by analyzing the common-mode change of the signals tapped at the measuring electrodes SE, it can be determined on which of the two ground electrodes the thumb is placed or if the thumb touches both of the ground electrodes. When the thumb rests on one of the two ground electrodes $E_{M1}$, $E_{M2}$, the capacitive sensor device or the sensor area A is brought into the mouse mode. Depending on which of the two ground electrodes $E_{M1}$, $E_{M2}$ the thumb rests on, the signals tapped at the measuring electrodes SE may be subject to different interpretation.

According to an alternative embodiment of the keyboard according to various embodiments, also two mechanical keys can be arranged in the cavity, each comprising a ground electrode $E_{M1}$, $E_{M2}$ on their surfaces. The mechanical keys may each function as a mouse button. This has the advantage that, on the one hand, resting the thumb on one of the two mechanical keys can activate the mouse mode of the keyboard and, on the other hand, inputs can be performed by pressing one of the two mechanical keys without having to take the thumb or the hand off the keyboard. This way, the control of, for instance, a cursor of a graphical user interface as well as for example the confirmation of a graphical operating control selected by means of the cursor can be achieved with only one hand resting on the keyboard.

Another advantage is that pressing the mouse buttons in the cavity only results in an activation of a corresponding event when a hand actually rests on the keyboard correspondingly since the common-mode interference of the sensor signal requires a sufficient capacity $C_{H1}$.

In order to detect which of the two ground electrodes $E_{M1}$, $E_{M2}$ is touched or whether both of the ground electrodes are touched by the thumb, it may for example be provided that at first both switches, which each couple the ground electrodes with the ground of the evaluation device, are closed. A switch is then opened and the signal tapped at the sensor electrodes or at the measuring electrodes is analyzed at the same time, respectively, in a predetermined order. When a common-mode change is detected for the electrical signal tapped at the measuring electrodes, it may be assumed that the thumb only rests on that ground electrode for which the switch is currently opened. As an alternative, at first all switches may be opened and then be closed in a predetermined order, respectively. When the common-mode of the electrical signal tapped at the measuring electrodes is changed, it may be assumed that the thumb rests on the corresponding ground electrode.

Figure 5:
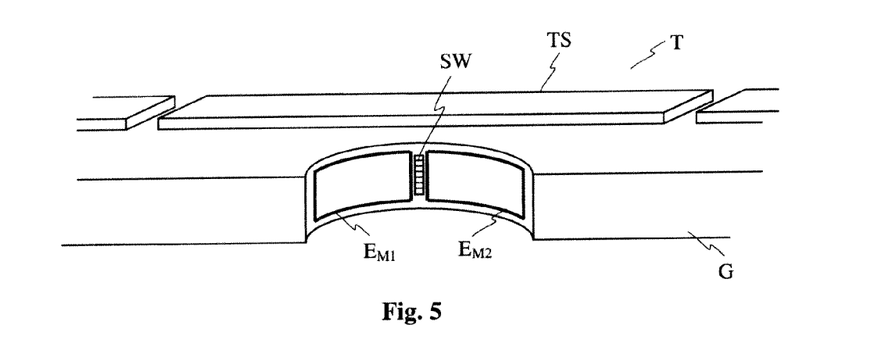
FIG. 5 the embodiment shown in FIG. 4, wherein an additional scroll wheel is arranged between the two ground electrodes.

FIG. 5 shows the section of a keyboard shown in FIG. 4, wherein a scroll wheel SW is arranged between the two ground electrodes $E_{M1}$, $E_{M2}$. The scroll wheel may provide additional input functions. For example, the scroll wheel SW may be used to enable a scrolling through the screen content. Since the scroll wheel is arranged between the two ground electrodes $E_{M1}$, $E_{M2}$, it may be provided that the scroll wheel is only active when the hand rests on the keyboard. Thus, unintended inputs via the scroll wheel can be avoided when no hand rests on the keyboard.

Figure 6:
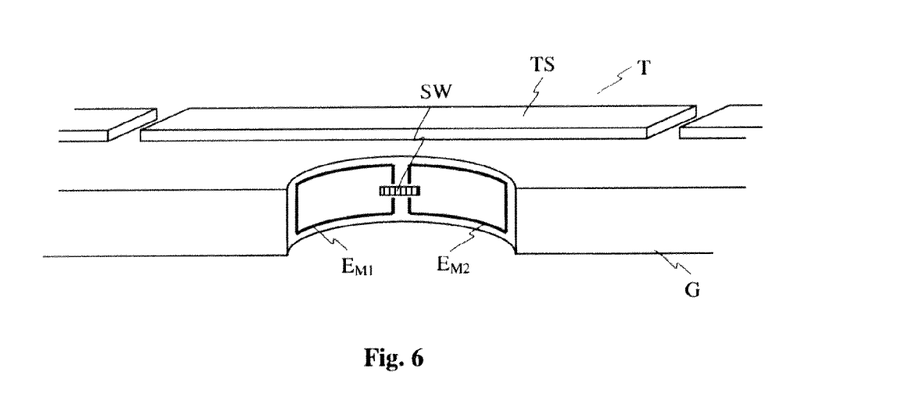
FIG. 6 the embodiment shown in FIG. 4, wherein a scroll wheel substantially orientated horizontally is arranged in the area between the two ground electrodes.

FIG. 6 shows the section of a keyboard shown in FIG. 4, wherein a scroll wheel which is substantially orientated horizontally is arranged between the two ground electrodes $E_{M1}$, $E_{M2}$. This scroll wheel SW may also provide an additional input possibility. According to a particular embodiment, this scroll wheel SW which is substantially orientated horizontally may also be only provided to facilitate a moving of the thumb for example from the left ground electrode $E_{M1}$ to the right ground electrode $E_{M2}$ or to give a haptic feedback to the user when the thumb moves from one ground electrode to the other ground electrode so that the user knows on which ground electrode the thumb is currently placed.

Figure 7A:
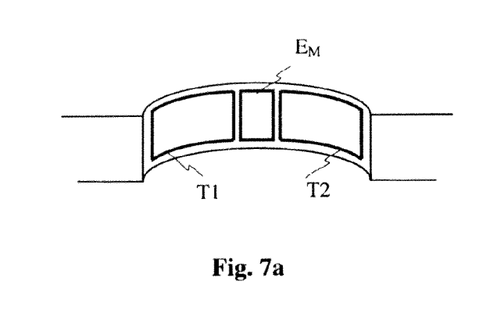
FIG. 7a, 7b each a section of the front rim portion of a keyboard, wherein a ground electrode is arranged between two keys.
Figure 7B:
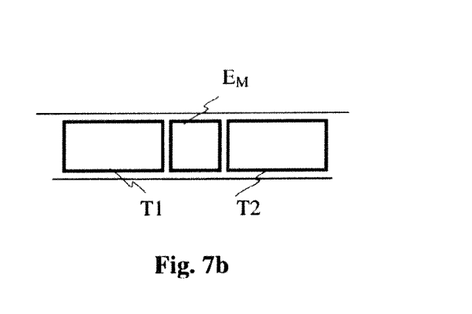

FIG. 7a and FIG. 7b each show an alternative embodiment of a section of the keyboard in front of the space bar TS. In FIG. 7a, a ground electrode $E_M$ is arranged in a cavity. Moreover, mechanical keys, such as mouse buttons $T_1$ and $T_2$, are arranged to the left and to the right of the ground electrode, respectively. These mouse buttons $T_1$, $T_2$ may for example be activated when the thumb is close enough to the ground electrode $E_M$, i. e. when a sufficient common-mode change is detected for the electrical signals tapped at the measuring electrodes.

According to FIG. 7b, the ground electrode $E_M$ and the two mouse buttons $T_1$, $T_2$ are arranged at the keyboard in the same way as according to FIG. 7a, wherein this section of the keyboard does not provide any cavity.

Figure 8:
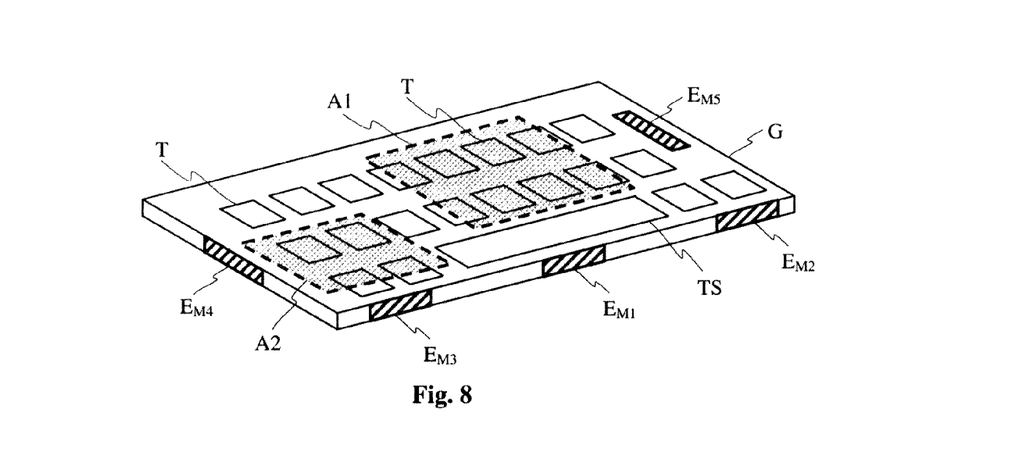
FIG. 8 another embodiment of an input device, particularly a keyboard with a number of sensor areas and a number of ground electrodes.

FIG. 8 shows another embodiment of an input device, particularly a keyboard. The keyboard comprises a number of conventionally arranged keys T. Two sensor areas $A_1$, $A_2$ are provided at the upper face of the keyboard housing G, which are each formed by a number of measuring electrodes SE not shown here. Furthermore, a number of ground electrodes $E_{M1}$ to $E_{M5}$ are arranged at the housing G, wherein the ground electrodes $E_{M1}$ to $E_{M4}$ are arranged at the rim portion of the keyboard and the ground electrode $E_{M5}$ is arranged at the upper face of the housing.

This arrangement of the ground electrodes enables an instruction of the user with regard to certain positions of the hand so that the input in the mouse mode can be more easily detected. For example, the arrangement of a ground electrode $E_{M4}$ at the left side of the housing forces the user to leave the left hand at the housing and only to perform the movements of the mouse with the right hand, resulting in a clearer detection of the movements. Likewise, a ground electrode $E_{M5}$ may be arranged at the right side of the housing so that the user leaves the right hand at the housing and the movements of the mouse are performed with the left hand. Both alternatives can be implemented for a better handling in order to enable a left-handed use as well as a right-handed use of the device.

Arranging conventional mouse buttons at the side of the keyboard also helps to achieve that these mouse buttons are operated by the hand which does not move the cursor. This way, this hand is far enough from the active area and cannot distort the sensor signals unintentionally.

A ground electrode $E_{M1}$ in the middle of the front face of the housing will urge the user to leave the thumb of a hand at the ground electrode $E_{M1}$ and to perform the movements of the mouse with the remaining fingers of the hand. This helps to avoid that the thumb resting on the ground electrode $E_{M1}$ unintentionally distorts the sensor signals of the alternating electrical field which is measured for the purpose of the cursor control, resulting in an increase of the robustness and the detection precision. The other hand can then be used for holding the device, which is particularly advantageous for small devices such as netbooks.

Providing several sensor areas $A_1$, $A_2$ and a number of ground electrodes $E_{M1}$ to $E_{M5}$ makes it possible to provide a huge number of different functions. For example, touching the ground electrode $E_{M1}$ with the thumb and simultaneously moving the index finger over the sensor area $A_1$ may cause a cursor to move, as described before. Touching the ground electrode $E_{M3}$ with the thumb and simultaneously moving, for instance, the index finger relative to the sensor area $A_2$ may for example cause a screen content displayed on the screen to move according to the movement of the index finger.

The keyboards shown before may for example be keyboards which can be connected to an electronic data processing device. However, the keyboards may also be keyboards of a portable computer, such as a notebook.

Furthermore, the capacitive sensor device or the input device according to various embodiments have the advantage that no additional receiving electronics is required since only additional electrodes (ground electrodes) have to be connected to the already existing receiving electronics of the capacitive sensor device via a switch.

The ground electrodes may comprise a metal and may be arranged at the outer face of the housing G in such a way that a touch of the ground electrode provides an additional haptic feedback for the user when he changes from the keyboard mode to the mouse mode.

What is claimed is:

1. A capacitive sensor device comprising
   at least one measuring electrode,
   at least one ground electrode configured to be at least partially directly touched by a user hand, and
   a capacitive sensor being coupled with the at least one measuring electrode, and being configured to determine a capacitive coupling between the at least one measuring electrode and a ground of the capacitive sensor from a measured sensor signal received from the at least one measuring electrode,
   wherein at least one ground electrode is electrically coupled directly with the ground of the capacitive sensor through a switch, wherein the capacitive sensor device is configured to change a switching status of the switch, and wherein the capacitive sensor is further adapted to detect a level drop of the measured sensor signal received from the at least one measuring electrode with respect to ground when the switching status of the switch changes to separate the direct electric coupling with the ground from the at least one ground electrode, wherein the level drop is generated in response to the user touching the ground electrode during the change in switching states of the switch.

2. A capacitive sensor device according to claim 1, comprising a plurality of ground electrodes, wherein each ground electrode is operable to be electrically coupled with the ground of the capacitive sensor via the switch, and wherein the capacitive sensor device is further adapted to change the switching status of the switch in a predetermined order, respectively, and to detect a level drop of the measured sensor signal received from the at least one measuring electrode.

3. A capacitive sensor device according to claim 1, wherein the at least one measuring electrode is configured to detect a relative position of a finger without touching.

4. An input device comprising a housing and a capacitive sensor device comprising:
- at least one measuring electrode,
- at least one ground electrode arranged within the housing to be at least partially directly touched by a user hand, and
- a capacitive sensor being coupled with the at least one measuring electrode and being configured to determine a capacitive coupling between the at least one measuring electrode and a ground of the capacitive sensor,
- wherein at least one ground electrode is electrically coupled directly with the ground of the capacitive sensor via a switch, wherein the capacitive sensor device is configured to change a switching status of the switch, and
- wherein the capacitive sensor device is further adapted to detect a level drop of the measured sensor signal received from the at least one measuring electrode when the switching status of the switch changes to separate the direct electric coupling with the ground from the at least one ground electrode, wherein the at least one measuring electrode and the at least one ground electrode are arranged at the housing for detecting a relative position of a finger without touching, wherein the level drop is generated in response to the user touching the ground electrode during the change in switching states of the switch.

5. An input device according to claim 4, comprising a plurality of measuring electrodes within a sensor area, which is configured for controlling a graphical user interface, by moving at least one finger of the hand relatively to the sensor area, and wherein the sensor area is activated for detecting the movement of the at least one finger when the at least one ground electrode is covered by at least one more finger of the hand.

6. An input device according to claim 4, wherein the ground electrode is arranged at the housing in an isolated manner.

7. An input device according to claim 4, wherein the at least one ground electrode comprises metal.

8. An input device according to claim 4, wherein the at least one ground electrode is arranged in a cavity of the housing.

9. An input device according to claim 8, wherein the at least one ground electrode comprises a first ground electrode and a second ground electrode, which are arranged in the cavity of the housing and/or which are arranged on a mechanical key, respectively.

10. An input device according to claim 4, wherein the at least one measuring electrode is arranged in the area of the keys of a keyboard.

11. An input device according to claim 4, wherein the input device is a keyboard.

12. An input device according to claim 4, comprising a plurality of ground electrodes, wherein each ground electrode of the plurality of ground electrodes is operable to be electrically coupled with the ground of the capacitive sensor via the switch, and wherein the capacitive sensor is further adapted to change the switching status of the switch in a predetermined order, respectively, and to detect a level drop of the measured sensor signal received from the at least one measuring electrode.

13. An input device according to claim 4, wherein the at least one measuring electrode is configured to detect a relative position of a finger without touching.

14. A method for the operation of an input device, comprising the steps of:
- receiving a sensor signal from at least one measuring electrode in order to determine a capacitive coupling between the at least one measuring electrode and a ground of the input device, and
- providing at least one ground electrode configured to be at at least partially directly touched by a user hand;
- connecting the at least one ground electrode electrically directly with the ground of the input device, measuring the sensor signal from the at least one measuring electrode;
- disconnecting the direct connection between the at least one ground electrode and the ground of the input device and measuring the sensor signal from the at least one measuring electrode;
- determining a level drop of the measured sensor signal when the at least one ground electrode is disconnected from the ground of the input device; and
- changing an operating mode of the input device when a predetermined level drop has been detected, wherein the level drop is generated in response to the user touching the ground electrode during the change in switching states of the switch.

15. A method according to claim 14, wherein a first operating mode comprises a keyboard mode and a second operating mode comprises a mouse mode.

16. A method according to claim 14, wherein the changing of a switching status of the switch is performed at predetermined time intervals.

17. A method according to claim 14, wherein.

18. A method according to claim 14, wherein a plurality of ground electrodes are provided and the steps of connecting, disconnecting and determining a level drop are performed for each of the plurality of ground electrodes.

19. An method according to claim 14, wherein the input device is a keyboard.

* * * * *